United States Patent
Roh et al.

(10) Patent No.: US 7,401,282 B2
(45) Date of Patent: Jul. 15, 2008

(54) SERVER SYSTEM FOR PERFORMING COMMUNICATION OVER WIRELESS NETWORK AND COMMUNICATION METHOD THEREOF

(75) Inventors: Young Hoon Roh, Seoul (KR); Jung Ho Kim, Seoul (KR); Jin Cheol Cho, Seoul (KR); Jae Won Chang, Seoul (KR); Sang Hyuk Kang, Pusan (KR); Sang Mahn Kim, Kyunggi-do (KR); Pan Su Kim, Kyunggi-do (KR); Kwang Hui Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 10/896,848

(22) Filed: Jul. 23, 2004

(65) Prior Publication Data

US 2005/0125713 A1    Jun. 9, 2005

(30) Foreign Application Priority Data

Dec. 9, 2003    (KR) ..................... 10-2003-0088961

(51) Int. Cl.
   *G08C 25/02* (2006.01)
(52) U.S. Cl. ....................................... 714/748
(58) Field of Classification Search ............... 714/748, 714/746, 749
   See application file for complete search history.

(56) References Cited

U.S. PATENT DOCUMENTS 5,442,637 A * 8/1995 Nguyen ...................... 714/708
6,359,877 B1 * 3/2002 Rathonyi et al. ............. 370/349
6,405,337 B1 * 6/2002 Grohn et al. ................. 714/749
6,414,938 B1   7/2002 Corke et al.
6,570,843 B1 * 5/2003 Wolfgang .................... 370/216
6,700,867 B2 * 3/2004 Classon et al. .............. 370/216
6,717,915 B1 * 4/2004 Liao et al. .................... 370/252
6,721,834 B2 * 4/2004 Das et al. ..................... 710/117
6,738,807 B1 * 5/2004 Matsui et al. ................ 709/223

(Continued)

FOREIGN PATENT DOCUMENTS

CN    1363164    8/2002

(Continued)

OTHER PUBLICATIONS

U.S. Appl. No. to 10/896,990. which was filed on Jul. 23, 2004.

(Continued)

*Primary Examiner*—Shelly Chase
*Assistant Examiner*—Guerrier Merant
(74) *Attorney, Agent, or Firm*—Greenblum & Bernstein, P.L.C.

(57) ABSTRACT

Disclosed are a server system for performing communication over a wireless network and a communication method thereof. The server system comprises at least one client device and a server device for performing a state monitoring operation or a control operation for the client device over the wireless network. When a data packet is sent, the server device begins to send a following packet by variably applying a transmission rate according to a network transmission state when a leading packet has been completely transmitted. Because a transmission rate can be set appropriately to the network state, the number of unnecessary retransmissions can be reduced. Therefore, transmission delay can be avoided and stable and rapid wireless communication can be achieved.

20 Claims, 4 Drawing Sheets

U.S. PATENT DOCUMENTS

| | | | |
|---|---|---|---|
| 6,809,632 B2* | 10/2004 | Kim et al. | 375/232 |
| 7,092,373 B2* | 8/2006 | Parantainen et al. | 370/337 |
| 2001/0005859 A1* | 6/2001 | Okuyama et al. | 709/245 |
| 2002/0194361 A1* | 12/2002 | Itoh et al. | 709/233 |
| 2003/0006883 A1* | 1/2003 | Kim et al. | 340/310.01 |
| 2003/0103243 A1* | 6/2003 | Watanabe et al. | 358/405 |
| 2003/0117956 A1 | 6/2003 | Lee | |
| 2003/0118031 A1* | 6/2003 | Classon et al. | 370/395.54 |
| 2003/0179719 A1* | 9/2003 | Kobayashi et al. | 370/282 |
| 2003/0191844 A1* | 10/2003 | Meyer et al. | 709/227 |
| 2004/0117038 A1* | 6/2004 | Karaoguz et al. | 700/11 |
| 2004/0131074 A1* | 7/2004 | Kurth | 370/428 |
| 2004/0156366 A1* | 8/2004 | Walls et al. | 370/394 |
| 2004/0176947 A1* | 9/2004 | Miyake et al. | 704/201 |
| 2005/0058154 A1* | 3/2005 | Lee et al. | 370/473 |
| 2005/0068894 A1* | 3/2005 | Yu et al. | 370/235 |
| 2007/0060152 A1* | 3/2007 | Sakamoto | 455/450 |

FOREIGN PATENT DOCUMENTS

| | | |
|---|---|---|
| EP | 1061699 | 12/2000 |
| EP | 1233564 | 8/2002 |
| EP | 1463228 | 9/2004 |

OTHER PUBLICATIONS

U.S. Appl. No. to 10/896,847, which was filed on Jul. 23, 2004.
U.S. Appl. No. to 10/896,843, which was filed on Jul. 23, 2004.
English language Abstract of CN 1363164.

* cited by examiner

SERVER SYSTEM FOR PERFORMING COMMUNICATION OVER WIRELESS NETWORK AND COMMUNICATION METHOD THEREOF

BACKGROUND OF THE INVENTION

1. Field of the Invention

The present invention relates to a server system for performing communication over a wireless network, and more particularly to a server system for performing communication over a wireless network and a communication method thereof that can reduce the number of retransmissions when a data packet is transmitted by providing a server device in which a pre-existing auto-fall back function for sequential, initial transmission rate setup is improved and the improved auto-fall back function for setting a transmission rate of the next packet is implemented on the basis of the last transmission rate of a leading packet when a data stream is sent, in wireless communication based on a transmitter-driven media access control (MAC) protocol.

2. Description of the Related Art

Conventionally, a media access control (MAC) protocol is based on one of two sub-layers classified by a multipoint connection in a local area network (LAN) requiring a line sharing/managing function. The two sub-layers include a logical link control (LLC) sub-layer and the MAC sub-layer. The MAC protocol allows a plurality of computers to share a single line. The MAC protocol widely employs an Ethernet based on Institute of Electrical and Electronics Engineers (IEEE) 802.3, a token bus based on IEEE 802.4 and a token ring based on IEEE 802.5.

The conventional MAC protocol will be described with reference to the annexed drawings. FIG. 1 is a flowchart illustrating a process for transmitting and receiving data and signals between server/client devices based on the conventional transmitter-driven MAC protocol. FIG. 2 is an explanatory view illustrating the data transmission process of a conventional server system for performing communication over the wireless network. An operating method of the conventional server system and the drawbacks thereof will be described with reference to FIGS. 1 and 2.

FIG. 1 shows flow of signals transmitted and received between the server/client devices. The server device to send data, that is, a transmitting stage (Tx), transmits a request-to-send (RTS) signal to a corresponding client device to receive data, that is, a receiving stage (Rx) (at the step of transmitting the RTS signal).

The client device receives the RTS signal from the server device. Subsequently, the client device transmits, to the server device, a clear-to-send (CTS) signal indicating that data can be sent, in response to the RTS signal (at the step of responding to the RTS signal).

After the RTS and CTS signals are exchanged, the server device sends data to the client device over a set communication channel (at the step of sending the data). The client device receiving the data sends a positive acknowledgement (ACK) signal to the server device when the data has been completely received (at the step of transmitting the ACK signal).

FIG. 2 is an explanatory view illustrating a process for sending a data packet from the server device during data communication between the server and client devices. First, the server device transmits a first request-to-send (RTS) signal RTS1 to a corresponding client device to receive data. The client device receives the first RTS signal RTS1 and then transmits a first clear-to-send (CTS) signal CTS1 to the server device.

After the RTS and CTS signals are exchanged, the server device initiates a data transmission operation and sends a data packet #0_6. Here, "0" denotes a packet number and "6" denotes the number of retransmissions. The data packet #0_6 indicates that the server device has sent a packet having the packet number "0" to the client device six times after the first packet transmission.

When the client device transmits a negative acknowledgement (NAK) signal NAK1 in spite of 6 retransmissions, the server device transmits a second RTS signal RTS2 for $7^{th}$ retransmission. Upon receiving a second CTS signal CTS2, the server device sends a data packet #0_7.

When the client device has completely received the data packet #0_7 normally, it transmits a positive acknowledgement (ACK) signal ACK2. The server device transmits a third RTS signal RTS3 to send the data packet #1_0. The client device transmits a third CTS signal CTS3 in response to the third RTS signal RTS3.

In a data transmission operation of the conventional server system, the server device implements an auto-fall back function while sequentially scanning transmission rates of 11 Mbps, 5.5 Mbps, 2 Mbps and 1 Mbps according to a distance between the server device and the client device. A transmission rate based on the conventional auto-fall back function will be described with reference to FIG. 2.

As the distance between the client device and the server device is long, the data packet #0_6 is sent over a communication channel based on a transmission rate of 1 Mbps as shown in FIG. 2. Moreover, when the data packet #0_6 has not been received, a data packet #0_7 is sent at the transmission rate of 1 Mbps.

When the client device has received the data packet #0_7, the server device sends a new data packet #1_0. In spite of a substantial data transmission rate of 1 Mbps, data begins to be sent at a transmission rate of 11 Mbps according to the conventional auto-fall back function.

Because a network environment at the time of transmitting a previous data packet is not considered in the conventional auto-fall back, a transmission rate of 11 Mbps is fixedly set whenever an operation for sending a new data packet is initiated. For this reason, a wireless network environment cannot be effectively employed, and the number of unnecessary retransmissions is increased. Moreover, data transmission is delayed or a data error is incurred, and the wireless network environment appropriate for multimedia streaming cannot be implemented.

SUMMARY OF THE INVENTION

Therefore, the present invention has been made in view of the above problems, and it is an object of the present invention to provide a server system for performing communication over a wireless network that can set a transmission rate according to a current network state and implement an improved auto-fall back function capable of reducing the number of unnecessary retransmissions, by sending data at a transmission rate immediately before a transmission rate of a new data packet when a server device begins to send the new data packet to a client device.

In accordance with one aspect of the present invention, the above and other objects can be accomplished by the provision of a server system for performing communication over a wireless network, comprising: at least one client device comprising a communicator for performing data communication with a server device over the wireless network; and the server device for performing a state monitoring operation or a control operation for the at least one client device, wherein the server device comprises: a network state detector for detecting a state of the wireless network whenever a data packet is sent; and a communicator for repeating a retransmission operation the predetermined number of times when failing to send the data packet, variably setting a transmission rate according to a transmission state of the network when a leading packet detected by the network state detector has been sent, and beginning to send a following packet at the variably set transmission rate.

In the above server system, the server device sets a transmission rate when beginning to send a new data packet (hereinafter, referred to as "following packet") to the client device. Moreover, the following packet can be sent at a transmission rate corresponding to a previous data packet (hereinafter, referred to as "leading packet"). For this, the communicator provided in the server device preferably comprises: a transmission rate setup module for comparing the number of leading packet retransmissions with the number of following packet retransmissions, sending the data packet at a last transmission rate of the leading packet if the number of leading packet retransmissions is equal to or larger than the number of following packet retransmissions, and sending the data packet at a current data transmission rate if the number of leading packet retransmissions is smaller than the number of following packet retransmissions.

Preferably, the communicators provided in the server and client devices comprise a wireless network modem for wireless networking, respectively. Each of the server and client devices comprises: an input unit for receiving various control signals; an output unit for outputting an operation and processing result based on the signals; and a controller for performing various control functions.

Preferably, the controller of the server device comprises: a memory for storing transmission rate information over the network, storing a positive acknowledgement signal after sending data to the client device, and storing the number of retransmissions when the leading packet is sent. The memory can be implemented using a buffer.

In accordance with another aspect of the present invention, the above and other objects can be accomplished by the provision of a communication method of a server system with an improved auto-fall back function, comprising the steps of: (a) transmitting, by the server device to send data, a request-to-send (RTS) signal to a corresponding client device; (b) transmitting, by the client device, a clear-to-send (CTS) signal to the server device in response to the RTS signal; (c) comparing, by the server device, the number of leading packet retransmissions and the number of following packet retransmissions, and sending a data packet from the server device to the client device over a communication channel at a predetermined transmission rate; and (d) transmitting a positive acknowledgement (ACK) signal when the client device has appropriately received the data packet from the server device, and transmitting a negative acknowledgement (NAK) signal when the client device has not appropriately received the data packet.

In order that the improved auto-fall back function can be implemented, the following packet is sent at a last transmission rate of the leading packet. For this, when the data is sent at a predetermined transmission rate at the step (c), the data packet is sent at the last transmission rate of the leading packet if the number of leading packet retransmissions is equal to or larger than the number of following packet retransmissions.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a server system for performing communication over a wireless network and a communication method thereof in accordance with preferred embodiments of the present invention will be described in detail with reference to the annexed drawings.

The server system for performing communication over the wireless network and the communication method thereof in accordance with the present invention can be implemented by various embodiments. Hereinafter, the best embodiments will be described. Because basic components of the inventive server system are the same as the conventional components, the identical components will not be described in detail.

Figure 1:
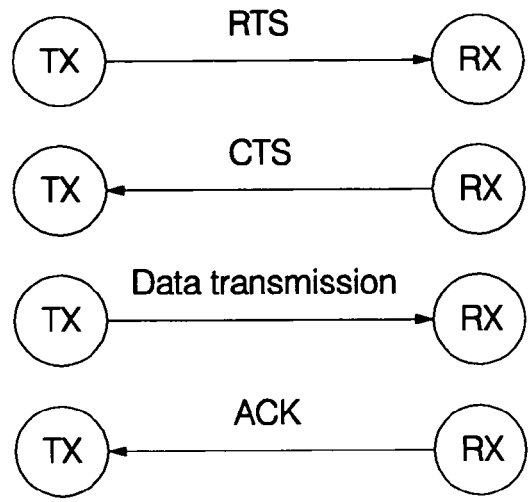
FIG. 1 shows signal flow based on a transmitter-driven media access control (MAC) protocol.
Figure 2:
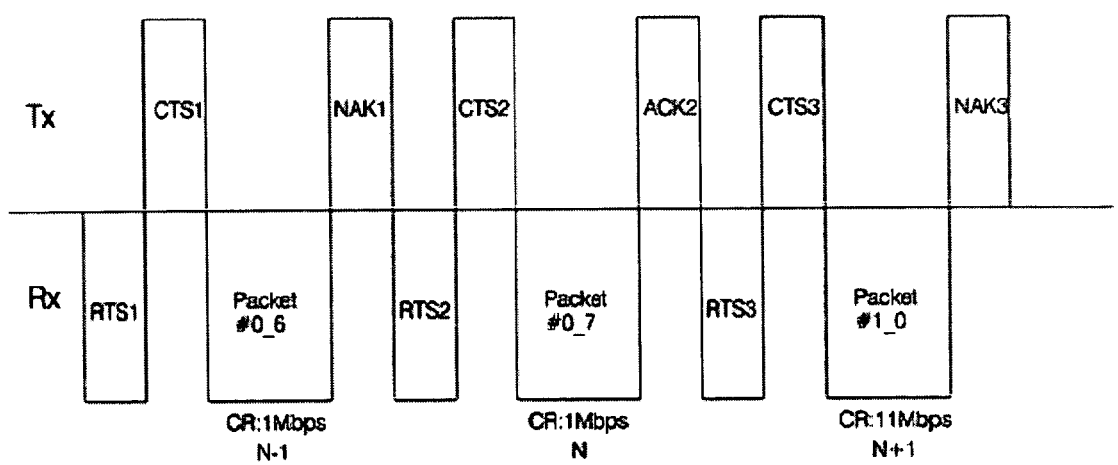
FIG. 2 is an explanatory view illustrating a transmission process of a conventional server system.
Figure 3:
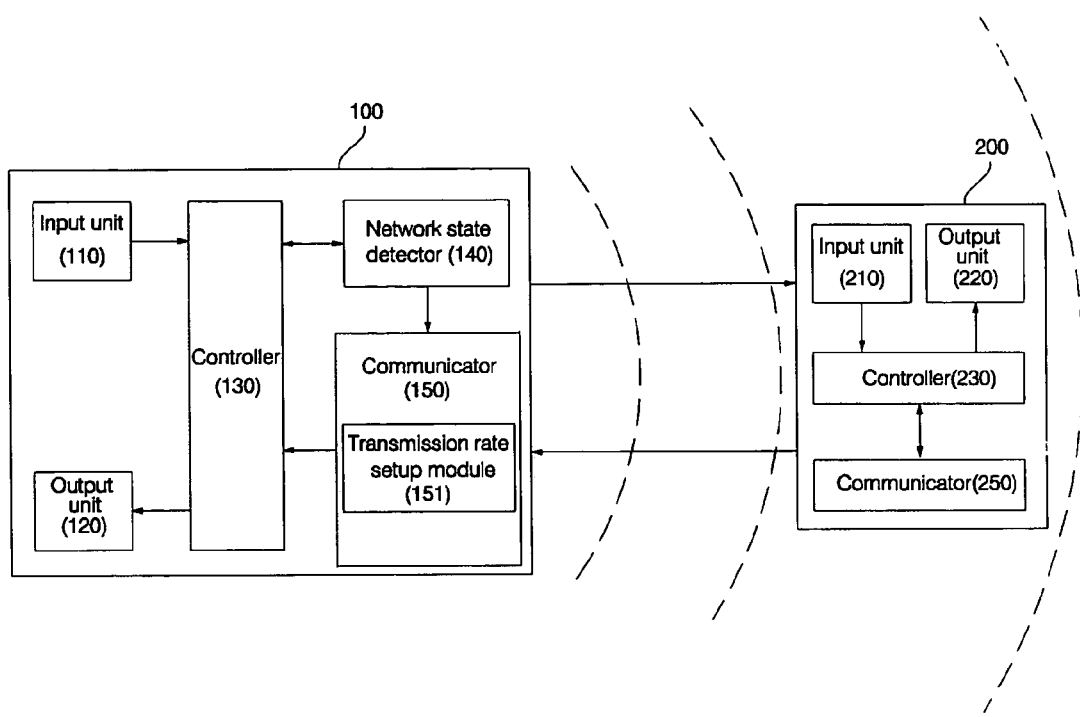
FIG. 3 is a block diagram illustrating server and client devices in accordance with the present invention.

FIG. 3 is a block diagram illustrating server and client devices in the server system in accordance with the present invention. In the server system in accordance with an embodiment of the present invention shown in FIG. 4, the server device is defined as an Internet-based refrigerator, and the client device is defined as a web pad capable of being attached to or separated from the Internet-based refrigerator. FIG. 5 is an explanatory view illustrating a transmission process of the server system in accordance with the present invention.

In relation to FIG. 3, the server system for performing communication over the wireless network comprises the server device 100 and the client device 200 capable of operating in response to a control signal from the server device 100. In this case, the server device 100 acts as a device capable of controlling or monitoring at least one client device 200 coupled thereto over a network constructed within a home The server device 100 comprises: an input unit 110 for allowing a user to directly input a control command to control the client device 200; and an output unit 120 for displaying an operation result when the server and client devices 100 and 200 perform a corresponding operation based on the command according to an input signal. Moreover, the server device 100 further comprises: a controller 130 for performing various processing functions in response to the control command received from the input unit 110 and a signal indicating a result of the processing based on the control command received from the client device 200 and for outputting an output signal based on the processing result to the output unit 120.

The server device 100 must transmit a control signal for controlling the client device 200 thereto over the wireless network. The controller 130 transmits a control command signal to a communicator 150 so that the communicator 150 can perform data communication with the client device 200.

In order that an improved auto-fall back function can be implemented, the transmission rates of leading and following packets are detected and compared to each other. According to a result of the comparison, a transmission rate of the following packet must be separately set. For this reason, the server device 100 further comprises a network state detector 140 for detecting a wireless network state whenever a data packet is sent.

Moreover, the communicator 150 compares the number of leading packet retransmissions and the number of following packet retransmissions detected by the network state detector 140. If the number of leading packet retransmissions is equal to or larger than the number of following packet retransmissions, a transmission rate setup operation is carried out so that a data packet is sent at the last transmission rate of the leading packet. Otherwise, if the number of leading packet retransmissions is smaller than the number of following packet retransmissions, the transmission rate setup operation is carried out so that the data packet is sent at a current transmission rate.

In order that the above function is performed, transmission rate information needs to be stored over the network. The controller 130 comprises a memory (not shown) for storing a positive acknowledgement (ACK) signal responding to the sent data after sending data to the client device 200, and storing the number of leading packet retransmissions. A determination is made as to whether or nor the leading packet has been appropriately sent, and transmission rate information of the leading packet is stored.

Moreover, the communicator 150 comprises a transmission rate setup module 151 for comparing the number of leading packet retransmissions stored in the memory (not shown) with the number of following packet retransmissions and setting the transmission rate of a following packet according to a result of the comparison, such that the improved auto-fall back function can be implemented.

The server device 100 can control or monitor the client device 200 over the above-described constitution. The client device 200 comprises: an input unit 210 for allowing a user to directly input a control command as in the server device 100; an output unit 220 for displaying a processing result based on input signals from the server and client devices 100 and 200; and a controller 230 for processing various control signals and transmitting a result of the processing to the output unit 220 and the communicator 250.

Moreover, the client device 200 receives various control command signals from the server device 100. The client device 200 comprises the communicator 250 for transmitting a processing result signal based on the control command to the server device 100.

The communicators 150 and 250 provided in the server device 100 and the client device 200 comprise a wireless network modem (not shown) responsible for wireless networking, respectively. An embodiment capable of employing the wireless networking function is shown in FIG. 4.

Figure 4:
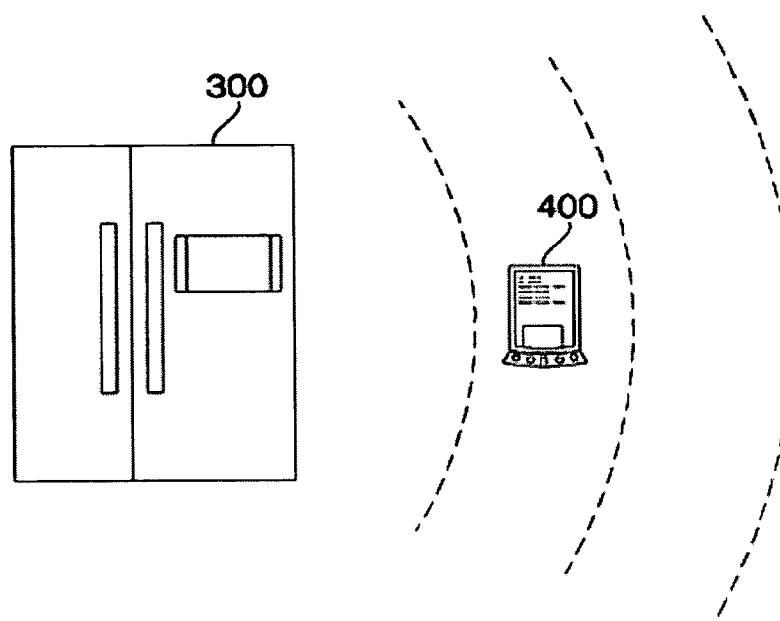
FIG. 4 shows an example of a server system in accordance with the present invention.
Figure 5:
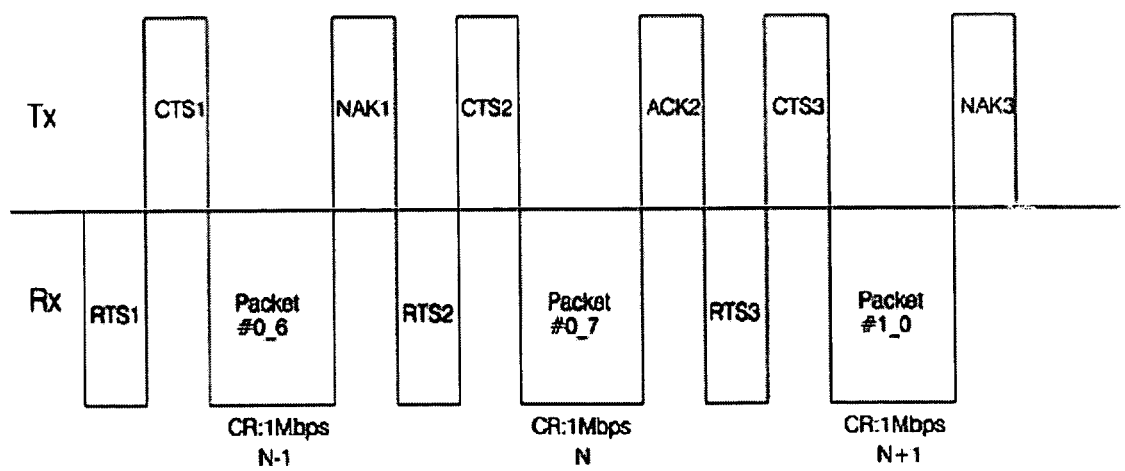
FIG. 5 is an explanatory view illustrating a transmission process of the server system in accordance with the present invention.

As shown in FIG. 4, this embodiment defines the server device 100 as an Internet-based refrigerator 300, and defines the client device 200 as a web pad 400 that performs data wireless communication in a wireless fashion, receives data from the Internet-based refrigerator 300, and displays the received data.

The web pad 400 is portable as a device capable of being attached to or separated from the Internet-based refrigerator 300. The web pad 400 can perform wireless communication within a predetermined radius from the Internet-based refrigerator 300. The transmission rates based on highest, higher, lower and lowest levels can be set so that transmission bandwidth varies with an access radius. In accordance with the present invention, the transmission bandwidth can be set to 11 Mbps, 5.5 Mbps, 2 Mbps or 1 Mbps. According to a distance between the Internet-based refrigerator 300 and the web pad 400 acting as an access point, an auto-fall back function is provided to automatically optimize a data transmission rate.

FIG. 5 is an explanatory view illustrating a transmission process of the server system in accordance with the present invention.

First, the server device 100 transmits a first request-to-send (RTS) signal RTS1 to the client device 200 to receive data. Subsequently, the client device 200 transmits a first clear-to-send (CTS) signal CTS1 to the server device 100 in response to the first RTS signal RTS1.

The server device 100 receiving the first CTS signal CTS1 retransmits data having a packet number 0 at a transmission rate of 1 Mbps six times. When the client device 200 transmits a negative acknowledgement (NAK) signal NAK1, the server device 100 transmits a second RTS signal RTS2 based on a $7^{th}$ retransmission operation for data. After receiving a second CTS signal CTS2 from the client device 200, the server device 100 sends a data packet #0_7.

When the data packet #0_7 is transmitted, a transmission operation is carried out at a transmission rate of 1 Mbps. When the client device 200 has appropriately received the data packet #0_7, it transmits a positive acknowledgement (ACK) signal ACK2 to the server device 100. The server device 200 transmits a third RTS signal RTS3 so that the next data packet #1_0 can be sent. In response to the third RTS signal RTS3, the client device 200 transmits a third CTS signal CTS3.

The server device 100 receiving the third CTS signal CTS3 begins to send a following packet having a packet number 1. In this case, the memory (not shown) provided in the controller 130 of the server device 100 stores information indicating 7 leading packet retransmissions detected by the network state detector 140. The number of leading packet retransmissions is compared with the number of following packet retransmissions. The transmission rate setup module 151 sends the following packet at a predetermined transmission rate according to a result of the determination.

It is determined that a previous transmission state of the wireless network is unstable because the number of leading packet retransmissions is 7 as shown in FIG. 5. When the first following packet #1_0 is sent, a transmission operation is initiated at the last transmission rate of 1 Mbps of the leading packet.

Accordingly, in a state where a sufficient transmission rate is not ensured in an unstable environment of the current network, data can be prevented from being conventionally sent from the client device 200 at 11 Mbps according to an initial setup operation of the server device 100. Consequently, because no transmission load or transmission delay occurs, the user is not inconvenienced.

If the following packet #1_0 is transmitted and received normally and an ACK signal ACK3 is received from the client device 200, it is determined that the following data has been received normally at the first transmission. Accordingly, the server device 100 can initiate the next packet transmission at a transmission rate of 2 Mbps when the next packet #2_0 is sent.

The communication method over the wireless network will be described in detail with reference to FIG. 6.

Figure 6:
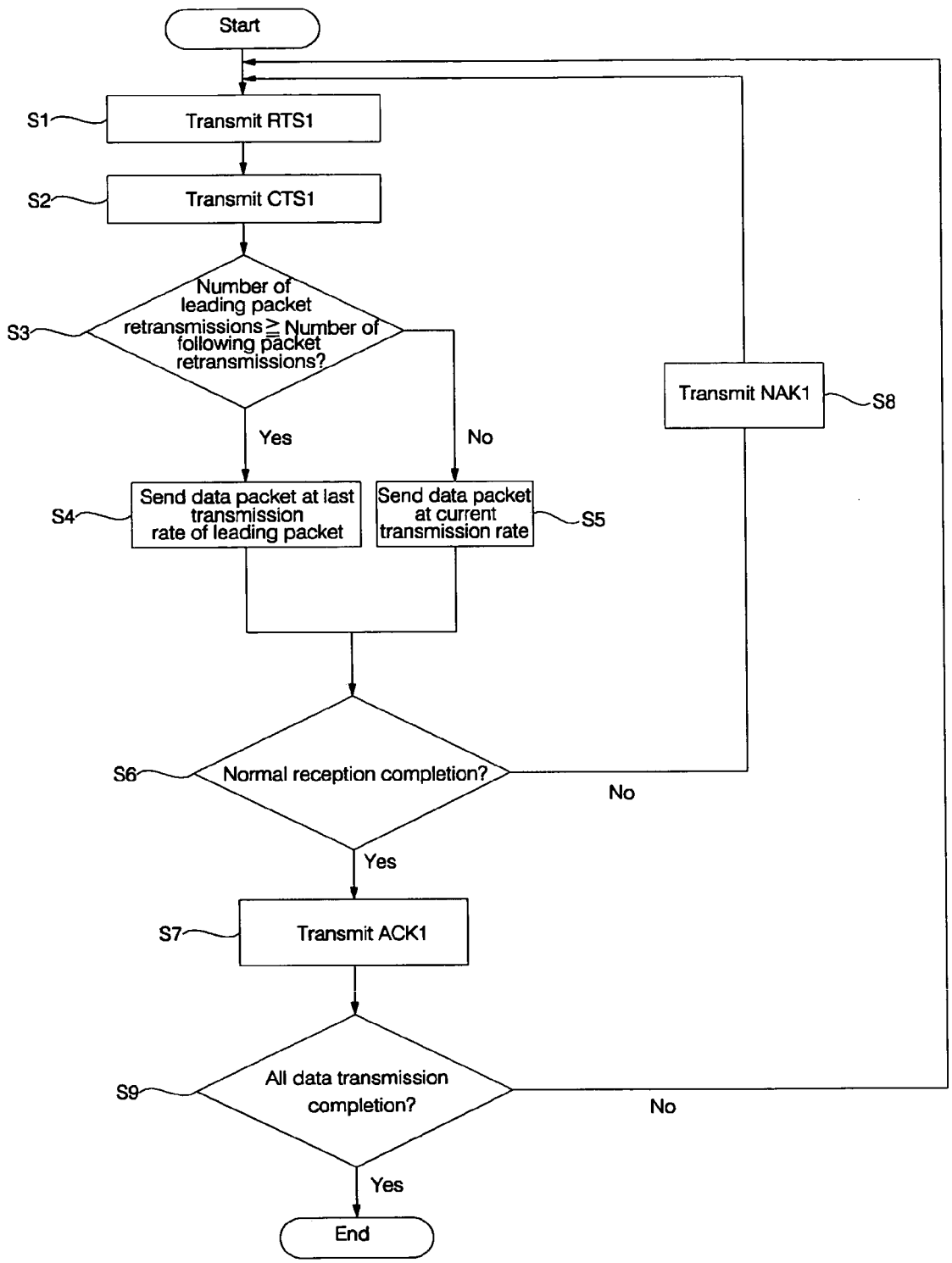
FIG. 6 is a flowchart illustrating a data transmission process of the server system in accordance with the present invention.

FIG. 6 is a flowchart illustrating a data transmission process of the server system in accordance with the present invention.

In the communication method over the wireless network in accordance with the present invention, the server device to send data transmits a first request-to-send (RTS) signal RTS1 to a corresponding client device in the wireless network coupled to the server system comprising the server device for transmitting and receiving data and at least one client device (S1).

The client device receives the first RTS signal RTS1 and transmits a first clear-to-send (CTS) signal CTS1 to the server device (S2).

In order that the server device can send a corresponding data packet (hereinafter, referred to as "following packet") at a transmission rate appropriate for the current network environment when sending the following packet, the server device compares the number of leading packet retransmissions immediately before the following packet transmission with the number of following packet retransmissions (S3). The server device sends the following packet to the client device over a communication channel at a predetermined transmission rate.

If the number of leading packet retransmissions is equal to or larger than the number of following packet retransmissions as a result of the comparison (S3), the server device begins to send the following packet at the last transmission rate of the leading packet (S4). Otherwise, if the number of leading packet retransmissions is smaller than the number of following packet retransmissions, the server device sends the following packet at the current data transmission rate (S5).

The client device determines whether or not the data packet sent from the server device has been appropriately received and transmits a signal indicating a result of the determination to the server device (S6). If the data has been appropriately received, the client device transmits a positive acknowledgement (ACK) signal ACK1 (S7). Otherwise, if the data has not been appropriately received, the client device transmits a negative acknowledgement (NAK) signal NAK1 (S8).

In the case where the NAK signal NAK1 is transmitted (S8), the server device retransmits data because the client device has not appropriately received the data. In this case, a retransmission process is initiated when the server device transmits a second RTS signal RTS2 to the client device and the client device transmits a second CTS signal CTS2 to the server device. Then, the above steps S1 to S6 are repeated.

When the client device has appropriately received data, the server device receives the ACK signal ACK1 and determines whether or not all data has been sent, to prepare the next data transmission operation (S9).

If all data has been sent, a data transmission process is terminated. Otherwise, if data to be sent remains, the server device transmits an RTS signal to the client device so that the next data can be transmitted.

If the data has not been appropriately received (S6), the NAK signal NAK1 is transmitted (S8). In the retransmission process, the second RTS signal RTS2 and the second CTS signal CTS2 are transmitted and received. At this point, if the retransmitted data has been appropriately received and it is determined that a transmission operation for all data has not been completed (S9), the server device transmits a third RTS signal RTS3 to the client device to send the next data. The client device transmits a third CTS signal CTS3 to the server device and the above steps S1 to S8 are repeated.

As apparent from the above description, the present invention provides a server system for performing communication over a wireless network and a communication method thereof that can avoid transmission overload, reduce the number of unnecessary retransmissions and achieve stable and rapid wireless communication by monitoring and temporarily storing transmission rate information of a leading packet and applying the last transmission rate of the leading packet to transmit the first following packet when a network state is unstable and the number of leading packet retransmissions is increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Patent Application No. 10-2003-0088961, filed on Dec. 9, 2003, the contents of which are herein expressly incorporated by reference in its entirety.

What is claimed is:

1. A server system for performing communication over a wireless network, comprising:
    at least one client device comprising a communicator which performs data communication with a server device over the wireless network; and
    the server device, which performs at least one of a state monitoring operation and a control operation for the at least one client device, wherein the server device comprises:
    a network state detector which detects a state of the wireless network when a leading data packet is sent; and
    a communicator which repeats a retransmission operation of the leading data packet a predetermined number of times when an acknowledgement of receipt of the leading data packet is not received, and sets an initial transmission rate of a following data packet based on a number of leading data packet retransmissions.

2. The server system according to claim 1, wherein the communicator provided in the server device comprises:
    a transmission rate setup module which compares a number of leading data packet retransmissions to a number of following data packet retransmissions, transmits the following data packet at a last transmission rate of the leading data packet when the number of leading data packet retransmissions is at least equal to the number of following data packet retransmissions, and transmits the following data packet at a transmission rate higher than the last transmission rate of the leading data packet when the number of leading packet retransmissions is smaller than the number of following packet retransmissions.

3. The server system according to claim 2, wherein the server device is comprised in an Internet-based refrigerator and the at least one client device couples to a home network.

4. The server system according to claim 3, wherein the client device is comprised in a web pad which receives a control command from the Internet-based refrigerator and displays a processing result.

5. The server system according to claim 4, wherein the web pad attaches to and separates from the Internet-based refrigerator.

6. The server system according to claim 1, wherein the communicators provided in the server device and the at least one client device comprise a wireless network modem for wireless networking.

7. The server system according to claim 1, wherein the server device comprises:
    an input unit which receives a control signal; and an output unit which outputs an operation and a processing result based on input signals from the client and server devices.

8. The server system according to claim 7, wherein the server device further comprises:
a controller which processes an input signal from the input unit and control signals from the at least one client device, transmits the control signals to the communicator provided in the server device so that the at least one client device can be controlled over the wireless network, and outputs a processing result based on the control signal to the output unit.

9. The server system according to claim 8, wherein the controller provided in the server device comprises:
a memory which stores transmission rate information a positive acknowledgement signal received after sending data to the client device, and a number of leading data packet retransmissions.

10. The server system according to claim 1, wherein the client device comprises:
an input unit which receives a control signal; and
an output unit which displays a processing result based on input signals from the client device and the server device.

11. The server system according to claim 10, wherein the client device further comprises:
a controller which processes an input signal from the input unit and control signals from the server device, and transmits a processing result based on the control signals to at least one of the communicator provided in the client device so that the processing result can be transmitted and the output unit so that the output unit can display the processing result.

12. A communication method of a server system for performing communication over a wireless network, the server system comprising at least one client device for performing data communication with a server device over the wireless network, and the server device, which performs at least one of a state monitoring operation and a control operation for the at least one client device, the method comprising:
comparing, by the server device, a number of leading data packet retransmissions to a number of following data packet retransmissions;
setting a transmission rate of a following data packet transmission based on the comparison; and
transmitting a following data packet from the server device to the at least one client device over a communication channel at the set transmission rate.

13. The communication method according to claim 12, wherein an auto-fall back function for optimizing a data transmission rate is implemented so that a data transmission rate is set according to a distance between the server device and the at least one client device when a data transmission operation is performed.

14. The communication method according to claim 12, wherein setting the transmission rate of the following data packet transmission comprises:
setting the transmission rate of the following data packet transmission to a last transmission rate of a leading data packet when the number of leading data packet retransmissions is at least equal to the number of following data packet retransmissions; and
setting the transmission rate of the following data packet transmission to a transmission rate higher than the last transmission rate of the leading data packet when the number of leading data packet retransmissions is smaller than the number of following data packet retransmissions.

15. The communication method according to claim 12, further comprising:
transmitting, by the server device, a request-to-send (RTS) signal to the at least one client device;
transmitting, by the at least one client device, a clear-to-send (CTS) signal to the server device in response to the RTS signal;
transmitting a positive acknowledgement (ACK) signal when the at least one client device has properly received a data packet from the server device, and
transmitting a negative acknowledgement (NAK) signal when the at least one client device has not properly received the data packet.

16. The communication method according to claim 15, further comprising transmitting, by the server device, another RTS signal, when the server device receives the NAK signal, and transmitting, by the at least one client device, another CTS signal to the server device in response to the another RTS signal.

17. The communication method according to claim 15 further comprising:
determining whether all data packets have been sent, when the at least one client device has properly received the data packet from the server device;
terminating a data packet transmission process, when it has been determined that all data packets have been sent; and
transmitting another RTS signal to the at least one client device, when it has been determined that all data packets have not been sent.

18. A server device, comprising:
a network state detector which detects a state of a wireless network when a leading data packet is sent; and
a communicator which repeats a retransmission operation of the leading data packet a predetermined number of times when an acknowledgement of receipt of the leading data packet is not received, and sets an initial transmission rate of a following data packet based on a number of leading data packet retransmissions.

19. The server device according to claim 18, wherein the communicator comprises:
a transmission rate setup module which compares a number of leading data packet retransmissions to a number of following data packet retransmissions, transmits the following data packet at a last transmission rate of the leading data packet when the number of leading data packet retransmissions is at least equal to the number of following data packet retransmissions, and transmits the following data packet at a transmission rate higher than the last transmission rate of the leading data packet when the number of leading packet retransmissions is smaller than the number of following packet retransmissions.

20. The server device according to claim 18, wherein the server device is comprised in an Internet-based refrigerator.

* * * * *